United States Patent
Hysek et al.

(10) Patent No.: US 9,651,922 B2
(45) Date of Patent: May 16, 2017

(54) WRISTWATCH WITH A TOUCH SCREEN AND METHOD FOR DISPLAYING ON A TOUCH-SCREEN WATCH

(75) Inventors: Jörg Hysek, Monaco (MC); Pascal Pozzo Di Borgo, Montreux (CH)

(73) Assignee: COMME LE TEMPS SA, St-Prex (CH)

( * ) Notice: Subject to any disclaimer, the term of this patent is extended or adjusted under 35 U.S.C. 154(b) by 556 days.

(21) Appl. No.: 13/334,823

(22) Filed: Dec. 22, 2011

(65) Prior Publication Data

US 2012/0092383 A1    Apr. 19, 2012

Related U.S. Application Data

(63) Continuation of application No. PCT/EP2010/059323, filed on Jun. 30, 2010.

(30) Foreign Application Priority Data

Jul. 3, 2009    (CH) ...................... 1036/09

(51) Int. Cl.
| | |
|---|---|
| *G04G 9/00* | (2006.01) |
| *G04G 21/08* | (2010.01) |
| *G06F 3/01* | (2006.01) |
| *G06F 3/0488* | (2013.01) |

(52) U.S. Cl.
CPC .............. *G04G 21/08* (2013.01); *G04G 9/00* (2013.01); *G06F 3/017* (2013.01); *G06F 3/04883* (2013.01)

(58) Field of Classification Search
CPC ....... G06F 3/017; G06F 3/04883; G04G 9/00; G04G 21/08

USPC ..................... 345/684; 368/10; 715/863, 864
See application file for complete search history.

(56) References Cited

U.S. PATENT DOCUMENTS

| | | | | |
|---|---|---|---|---|
| 5,434,591 A | * | 7/1995 | Goto et al. .................... | 345/688 |
| 6,266,098 B1 | * | 7/2001 | Cove .................. | H04N 5/44543 |
| | | | | 348/563 |
| 6,477,117 B1 | | 11/2002 | Narayanaswami et al. | |
| 6,747,680 B1 | * | 6/2004 | Igarashi et al. ............... | 715/784 |
| 6,967,903 B2 | | 11/2005 | Guanter | |
| 7,031,228 B2 | | 4/2006 | Born et al. | |
| 7,170,496 B2 | | 1/2007 | Middleton | |
| 7,247,568 B2 | | 7/2007 | Grupp et al. | |
| 7,751,285 B1 | * | 7/2010 | Cain ............................... | 368/82 |
| 2003/0123328 A1 | | 7/2003 | Guanter | |
| 2004/0190380 A1 | | 9/2004 | Wojcieszak | |
| 2005/0278757 A1 | | 12/2005 | Grossman et al. | |

(Continued)

FOREIGN PATENT DOCUMENTS

| | | |
|---|---|---|
| CH | 627615 A | 1/1982 |
| EP | 1394640 A1 | 3/2004 |

(Continued)

*Primary Examiner* — Eric J Bycer
(74) *Attorney, Agent, or Firm* — Blank Rome LLP

(57) ABSTRACT

Wristwatch (1) comprising: a digital matrix display (4); a two-dimensional sheet of touch-sensitive glass (3) provided with a plurality of electrodes (10, 11, 12) for detecting the movements of at least one finger along two different directions; a processing circuit laid out so as to interpret the signals from said electrodes and to scroll cards (23, 220-225, 210-213) on said display (4) in order to lastingly replace the initially displayed card (23) with another card; wherein the scrolling direction depends on the direction of said movement.

24 Claims, 6 Drawing Sheets

(56) References Cited

U.S. PATENT DOCUMENTS

| | | |
|---|---|---|
| 2006/0026535 A1* | 2/2006 | Hotelling et al. ............ 715/863 |
| 2006/0092177 A1 | 5/2006 | Blasko |
| 2006/0092770 A1* | 5/2006 | Demas .......................... 368/223 |
| 2006/0190833 A1* | 8/2006 | SanGiovanni et al. ....... 715/767 |
| 2008/0168404 A1 | 7/2008 | Ording |
| 2009/0007017 A1* | 1/2009 | Anzures .............. G06F 3/04883 715/835 |
| 2009/0199130 A1* | 8/2009 | Tsern et al. ................... 715/810 |
| 2009/0199241 A1* | 8/2009 | Unger et al. ..................... 725/41 |
| 2010/0095240 A1* | 4/2010 | Shiplacoff ............ G06F 3/0483 715/784 |
| 2010/0156676 A1* | 6/2010 | Mooring et al. ................ 341/20 |

FOREIGN PATENT DOCUMENTS

| | | |
|---|---|---|
| EP | 1544178 A1 | 6/2005 |
| EP | 1808751 A1 | 7/2007 |
| JP | 2003-215273 | 7/2003 |
| JP | 2009250741 A | 10/2009 |
| WO | WO-03/056397 A1 | 7/2003 |
| WO | WO-2006/111481 A2 | 10/2006 |
| WO | WO-2009/097592 A1 | 8/2009 |
| WO | WO-2011/000893 A1 | 1/2011 |

\* cited by examiner

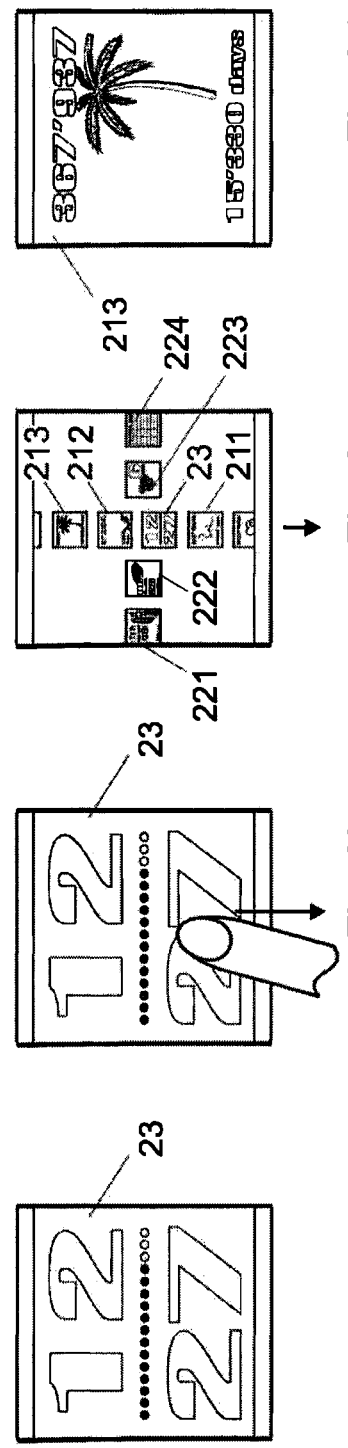

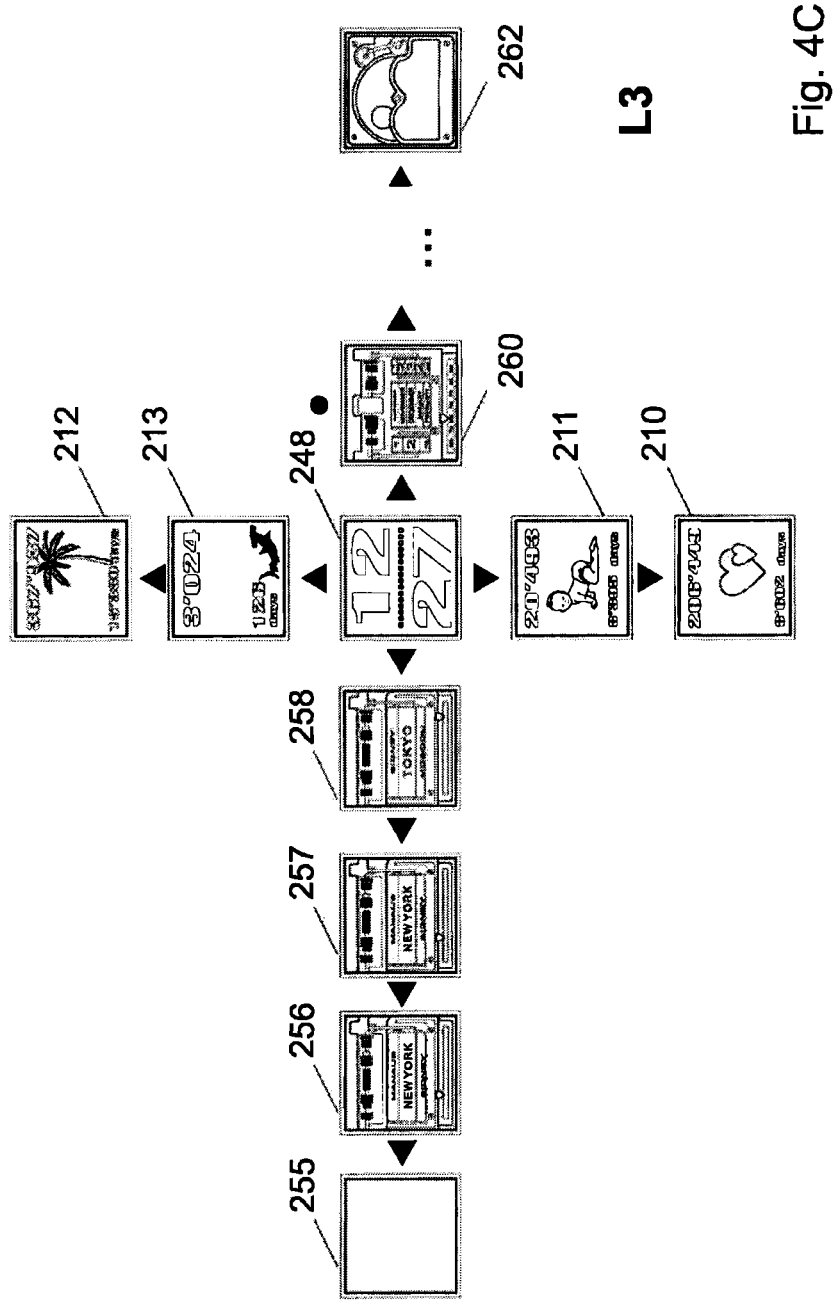

WRISTWATCH WITH A TOUCH SCREEN AND METHOD FOR DISPLAYING ON A TOUCH-SCREEN WATCH

The present application is a continuation of international patent application PCT/EP2011/000893 filed 30 Jun. 2010, the contents of which are incorporated herewith by reference. It claims priority of Swiss patent application CH2009/1036, filed 3 Jul. 2009, the contents of which are incorporated herewith by reference.

TECHNICAL FIELD

The present invention concerns a wristwatch, in particular an electronic wristwatch having a high-resolution display screen and a haptic surface.

STATE OF THE ART

Usual watches with a numeric display have several segments of liquid crystals controlled selectively in order to display the digits or symbols corresponding for example to the current time. The number of symbols that can be displayed is limited by the configuration of the segments.

Wristwatches with a matrix display, i.e. a display formed of a matrix of pixels, are also known. These displays are more flexible than the segment displays and enable any symbols or images to be displayed. The present invention is more particularly concerned with such watches with a matrix display.

Furthermore, wristwatches with a sheet of touch-sensitive glass allowing it to react to the user's finger on clearly identified portions of the glass are also known. Thus, U.S. Pat. No. 6,967,903 describes a method for controlling the different functions of a watch by pressing on predefined haptic zones on the glass. These zones are operated like buttons to trigger particular functions. This is called zero-dimension navigation: the haptic surface reacts only to contacts on precise zones of the glass. As the haptic zones are generally transparent, it is necessary to indicate their position on the dial or on the bezel; the number of haptic zones is thus necessarily limited by the space required for these indications.

EP1394640 describes another watch with haptic control having twelve sensors around the glass. The order in which the sensors are activated is recognized. This watch suffers from the same disadvantages and enables at most twelve different commands to be entered.

WO2006111481 describes a watch with a touch screen presenting juxtaposed zones that can be selectively displayed and that are sensible to the touch. The haptic zones have the shape of the display surfaces, which constitutes a serious technological limitation. In practice, one often wishes to promote small-size display zones to increase resolution and much wider haptic surfaces to reduce the energy consumption and facilitate the connection between the tactile glass and the movement.

WO03056397 pertains to a watch wherein the time is displayed in numeric and/or analog fashion by a liquid crystal display. The watch comprises several electrodes on the periphery of the glass and which can be activated separately by the finger.

EP1511178 describes a method for manufacturing a watch glass with invisible electrodes forming the sensors of a touch screen.

U.S. Pat. No. 6,477,117 describes a portable device with a touch screen. Access to different available applications is gained by selecting with the finger an icon of the application on a virtual desktop—in the same manner as on a computer screen. The size of the icons that can be displayed on a watch screen is necessarily very limited, which causes a problem of ergonomics in particular for people suffering from reduced visual acuity.

One-dimensional touch screens that react to the movement or position of the finger along a linear axis are also known. CH627615 describes for example a watch with a triangular-shaped capacitive electrode. The electronic circuit is capable of detecting the finger's position along this electrode. Such linear screens are typically used for controlling linear buttons or regulating elements, for example for unlocking a device or adjusting the sound volume.

Finally, two-dimensional touch screens are also known that are capable of detecting and reacting to movements of the finger along two distinct directions on the screen surface. By comparison with zero-dimensional systems that react to the absolute position of the finger, haptic systems detecting the movement and/or the trajectory of the finger afford the advantage of a more ergonomic use. The finger can thus be moved to any place of the screen; it is not necessary to indicate the zone that is to be activated.

Two-dimensional touch screens use electrodes that are very close together, nearly contiguous. A finger laid on the haptic surface generally covers variable portions of several adjacent electrodes. A software computes the finger's center of gravity from signals supplied by several electrodes and determines the finger's movement from the variation in the position of this center of gravity through time.

Two-dimensional touch screens thus require electrodes and a signal processing circuit that are clearly more complex than zero- or one-dimensional screens; they are generally reserved to devices having sufficient processing power and energy supply, for example portable computers, PDAs and more recently many portable telephones. These devices have screens with a clearly greater surface than that of a watch glass; even a mobile telephone has a considerably greater surface than that of the largest conceivable watches. These large screen sizes enable graphical interface elements, for example several icons, menu bars etc., to be displayed, which it is nearly impossible to represent on a wristwatch. The navigation between the different programs or documents in the graphical interface of a wristwatch raises very specific problems that are different than those that arise with a screen that is even slightly larger.

Watches are usually considered too small to allow or require a movement of the finger to be detected. Furthermore, there is a bias in the watch-making industry against sophisticated touch screens, whose necessary energy consumption, refresh time or computer power are dreaded. Furthermore, watch screens are generally considered too small to allow functions to be selected by means of icons or other widgets that are frequently found in graphic user interfaces of computers or mobile telephones.

Because of these biases, and because the usefulness of detecting a movement on a watch glass with a reduced surface is not obvious, watches with digital displays are not provided with two-dimensional haptic surfaces nor with software enabling a movement of the finger along two directions to be detected.

Furthermore, one also distinguishes between single touch haptic surfaces (mono-haptic) and multi-touch (or multi-haptic) surfaces. A multi-touch surface is understood in the present application to refer to a haptic surface or touch screen capable of detecting several simultaneous contact points, for example simultaneous movements of several fingers on the haptic surface. The electrodes of these devices are usually associated to a circuit or a software that interprets these simultaneous contacts and converts them into commands for a graphical user interface.

Thus, EP1808751 describes a watch with L-shaped capacitive haptic keys that are dimensioned so as to allow the finger to select simultaneously one or two adjacent keys. This watch enables the contact of one finger on two adjacent electrodes to be detected, but not the contact of two distinct fingers on electrodes further apart; it is thus not a multi-touch screen.

There is also a bias in the state of the art against using multi-touch screens in wristwatches, whose glass is generally considered too small to allow the contact, or even more the simultaneous movement, of several fingers.

A limited number of documents however describe wristwatches that allow commands to be entered by moving the finger on a tactile glass.

U.S. Pat. No. 7,170,996 describes a data input system for a compact electronic apparatus enabling notably characters to be selected in a matrix with the aid of different movements of the finger. The proposed solution only makes it possible to navigate in a specific menu prepared to this effect; data entry requires tedious training.

U.S. Pat. App. No. 2006/0092177 describes a watch with a sensor in each corner allowing different commands to be entered by selecting one of the sensors or a sequence of sensors actuated in a particular order. One of the commands makes it possible to display a "card" presenting complementary information, for example a list of received messages, a list of alarms, etc. This card is displayed during a limited period of time and disappears automatically after a short while. However, the arrangement of non-contiguous electrodes suggested in this document makes the command inputting less intuitive; this is not a two-dimensional haptic surface. The user must move his finger accurately on the haptic surfaces and a finger moving across the center of the glass will not be detected. Complex and hard-to-remember selection sequences must be used to access the different functions offered. The number of subsidiary functions that can be displayed is limited by the number of sensors.

There is thus a need in the prior art for a wristwatch provided with a tactile (i.e., touch-sensitive) glass making it possible to enter commands without having to press on a particular zone of the glass.

There is in particular a need for a wristwatch allowing movements of a finger on a touch screen to be detected.

In particular, there is a need for a wristwatch of which at least certain elements, including the haptic surface, the signal processing circuit coming from the electrodes of this surface, the processor and the graphical interface, are adapted to the particular constraints of a wristwatch, in particular the reduced surface of the screen and the very strict requirements in terms of electric consumption and computation power available.

There is also a need for a wristwatch enabling a large number of different indications to be displayed without however cluttering up the display. This watch should furthermore afford easy and intuitive access to different available items of information by means of commands that are easy to learn and to enter on a touch-sensitive (tactile) glass.

There is also a need for a wristwatch that allows the type of information displayed and the manner in which this information is presented to be customized.

BRIEF SUMMARY OF THE INVENTION

According to the invention, these aims are achieved notably by means of a wristwatch having:

a digital matrix display;

a sheet of touch-sensitive glass provided with a plurality of electrodes;

a processing circuit laid out so as to interpret the signals from said electrodes, for selecting a card from among several available cards depending on these signals and for displaying said card on the entire digital matrix display;

wherein said touch-sensitive glass is a two-dimensional touch-sensitive glass for detecting the movements of at least one finger along at least two different directions;

wherein the processing circuit is programmed so as to cause cards to scroll past in order to lastingly replace the initially displayed card with another card, wherein the scrolling direction depends on the direction of said movement.

In the present description, the term "card" describes a control, or widget, displayed on the watch's graphical interface to represent on the entire screen a unit such as the current time, a phase of the moon, a chronograph display etc. A card comprises a screen background image designed to occupy the entire watch screen; this image can be fixed, for example for displaying a photograph, or periodically refreshed, for example for displaying the current time. The card can furthermore be associated to a function (computer program or module) determining the indications displayed on the screen background; for example, a card can be associated to a program computing and displaying, in a text or graphic form, the phase of the moon. A card can furthermore define the behavior of the haptic interface and the functions or modules that are to be launched depending on the movements of the finger on the screen.

Thus, navigating in the watch's graphical interface is achieved by having virtually juxtaposed cards scroll past, so as to replace the entire image of one card by another image corresponding for example to a card and for displaying another function. It is thus possible to avoid the disadvantages of conventional graphical interfaces in which the launching of programs or functions is achieved by selecting a minuscule icon of the program on the screen background. Here, the icons are replaced by cards that generally occupy the entire screen and that display the useful information.

These cards can be customized by the user, who also has the option of adding new cards from an external computer connected to the watch, in order to add new functions and/or to modify the way in which an indication is displayed.

The invention is also based on the observation that the number of different movements the users are able and willing to learn in order to operate the watch is limited. To this effect, the watch's software is advantageously controlled mainly or even exclusively with the aid of horizontal or vertical movements of the finger on the glass. Most of the watch's functions, or even all its functions, can thus be accessed with these two very simple commands.

The touch-sensitive glass enables the movements of the finger in a horizontal or vertical direction to be detected in a reliable manner without the user having to go over specific electrodes to enter a given command.

In one embodiment, tap commands (brief contact of the finger on the glass) or double tap commands (two brief contacts in quick succession) can also be entered, for example to confirm a command or launch a function, in a manner similar to the click and double click performed with the mouse of a computer graphical interface. These commands can, depending on the case, be entered on clearly displayed zones of the screen—for example on a "START" button in chronograph mode—or anywhere on the screen.

The wristwatch also has the advantage that it is very easy to switch from one card to another by simple horizontal or vertical movements of the finger on the glass in order to cause juxtaposed cards to scroll past.

The scrolling past from one card to another can for example correspond to a mode switch of the watch. For example, the switch from a "display of the current time" mode to a "display of another time zone" mode is achieved by cards scrolling past and by replacing the entire image displayed on the watch screen with the image of another card.

The present invention also concerns the organization of the cards and the method used for the card scrolling so as to render the operation as quick and intuitive as possible.

In the present text, the "horizontal" direction of the watch corresponds to the {9 o'clock-3 o'clock} direction on the dial of a traditional watch; the "vertical" direction is parallel to the {6 o'clock-12 o'clock} direction.

BRIEF DESCRIPTION OF THE FIGURES

Examples of embodiments of the invention are indicated in the description illustrated by the attached figures in which:

FIGS. 3a to 3d illustrate diagrammatically the watch display after a vertical scroll command has been entered to replace the initially displayed card with another card.

FIGS. 4A to 4C illustrate diagrammatically the card organization on several navigation levels in one embodiment of the watch.

EXAMPLE(S) OF EMBODIMENTS OF THE INVENTION

Figure 1A:
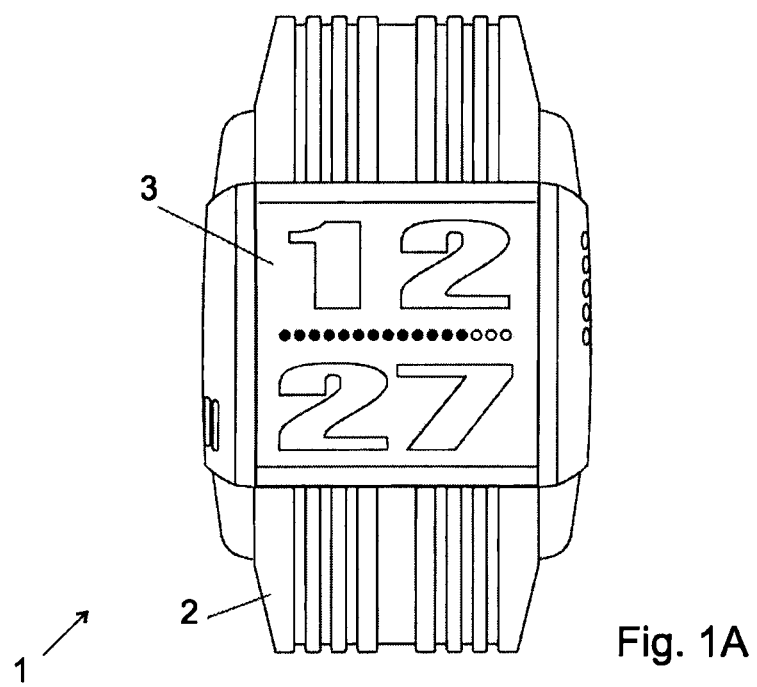
FIGS. 1a and 1b illustrate a perspective view of two embodiments of the wristwatch according to the invention, with two different cards being displayed.
Figure 1B:
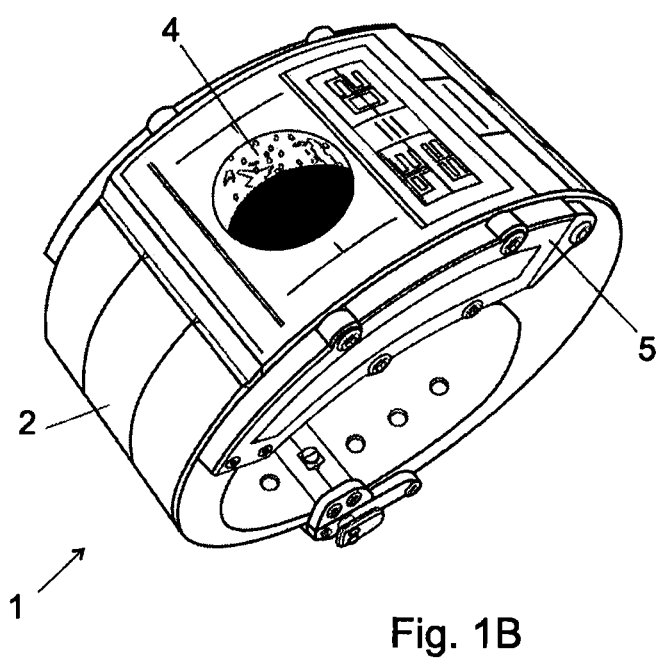

FIGS. 1a and 1b illustrate two embodiments of a wristwatch 1 according to the invention. The illustrated watch comprises notably a bracelet 2 and a case 5 provided with a glass 3 covering a digital matrix display 4.

The case 5 can comprise control elements, for example push-buttons, a crown etc., that are however not indispensable to the operation; in a preferred embodiment, the watch has no crown and is provided only with push-buttons (not represented) for switching the screen on or off or to adjust its luminosity. A luminosity sensor enabling the intensity of the screen to be automatically adapted to the surrounding luminosity can also be used as an option. The watch can switch nearly instantly from a stand-by mode, where the display is switched off or at least less luminous, to a "time reading" and/or navigation mode, for example as soon as the glass is touched or following a tap or double tap on the touch screen.

The case 5 can also comprise a connector to connect the watch to an external computer, for example a micro or nano USB connector on the bottom or in one of the watch's sides. Wireless connection means, for example a ZIGBEE (International registered trademark) or BLUETOOTH (US registered trademark) module, can also be provided.

The watch is advantageously powered electrically by means of a rechargeable accumulator through a micro or nano USE connector, of a specific or proprietary connector or, in a variant embodiment, through a radiofrequency interface.

The bracelet 2 can for example be made of rubber or of any other suitable material. In one embodiment, it comprises additional indicators, for example LEDs or an LCD screen, embedded in the bracelet's material and enabling complementary indications to those of the matrix display 4 to be shown. The indicators are preferably powered and controlled by the watch's processing circuit (not illustrated) and allow for example indications relative to the state of the watch (for example the battery charge level) or time indications depending on the current display (for example a number of timed laps) to be displayed. There is thus an electric connection between the bracelet's indicators and the electronic watch movement.

The glass 3 closes the upper surface of the case and covers the digital matrix display 4. It is preferably made of sapphire or of another scratchproof material and is coated with an anti-glare treatment. In a preferred embodiment, the glass is cylindrically, or possibly spherically, cambered.

Transparent electrodes are placed in or under the glass 3 in order to detect the presence of a finger or of a stylus. The detection technology preferably uses methods known in the state of the art, for example a capacitive detection.

A high-resolution digital matrix display 4 occupies nearly the entire surface under the glass 3 and thus serves both as watch dial and as time indicator. In a preferred embodiment, the display is constituted by a color liquid crystal display (LCD or TFT-LCD) with at least 150×150 pixels. Other types of display, including displays based on the OLED technology for example, can also be used. Furthermore, the watch could also have several displays, for example several digital displays, or a digital matrix display combined with hands or other mechanical indicators.

The mentioned processing circuit enables the signals coming from the electrodes to be interpreted and indications depending on these signals to be displayed on the matrix display 4. The processing circuit typically comprises a microcontroller for controlling the matrix display, another microcontroller for controlling the haptic interface, and a general microcontroller for determining the indications to be displayed at each instant, depending on the card selected. These microcontrollers can also be grouped differently.

An input-output circuit, for example a USB decoder or a BLUETOOTH (US registered trademark) or ZIGBEE (International registered trademark) receiver, can also be provided.

The processing circuit is specifically arranged to interpret the signals from said electrodes, to select a card from among several available cards depending on these signals, and to display said card on the whole of said digital matrix display; this arrangement is preferably achieved by storing in the microcontroller's memory a computer program (firmware) allowing this specific operation to be controlled. The firmware causes the cards to be displayed including images stored in a memory and that are reproduced on the display 4. Advantageously, the software and/or data used by this software can be modified or updated by the user, for example through the USB, BLUETOOTH (US registered trademark), ZIGBEE (International registered trademark) or other interface mentioned further above. This interface makes it possible for example to load new cards or new images used on these cards and to thus customize the cards and the graphic elements represented on these cards.

The size and the resolution of the display 4 are sufficient for displaying simultaneously several indications on the same card, for example the current time in FIG. 1A or the current time and the phase of the moon in FIG. 1B. In order to extend the watch's functionalities, the user can switch from one display mode to another and for example replace the card displayed in FIG. 1A by the card of FIG. 1B.

Figure 2:
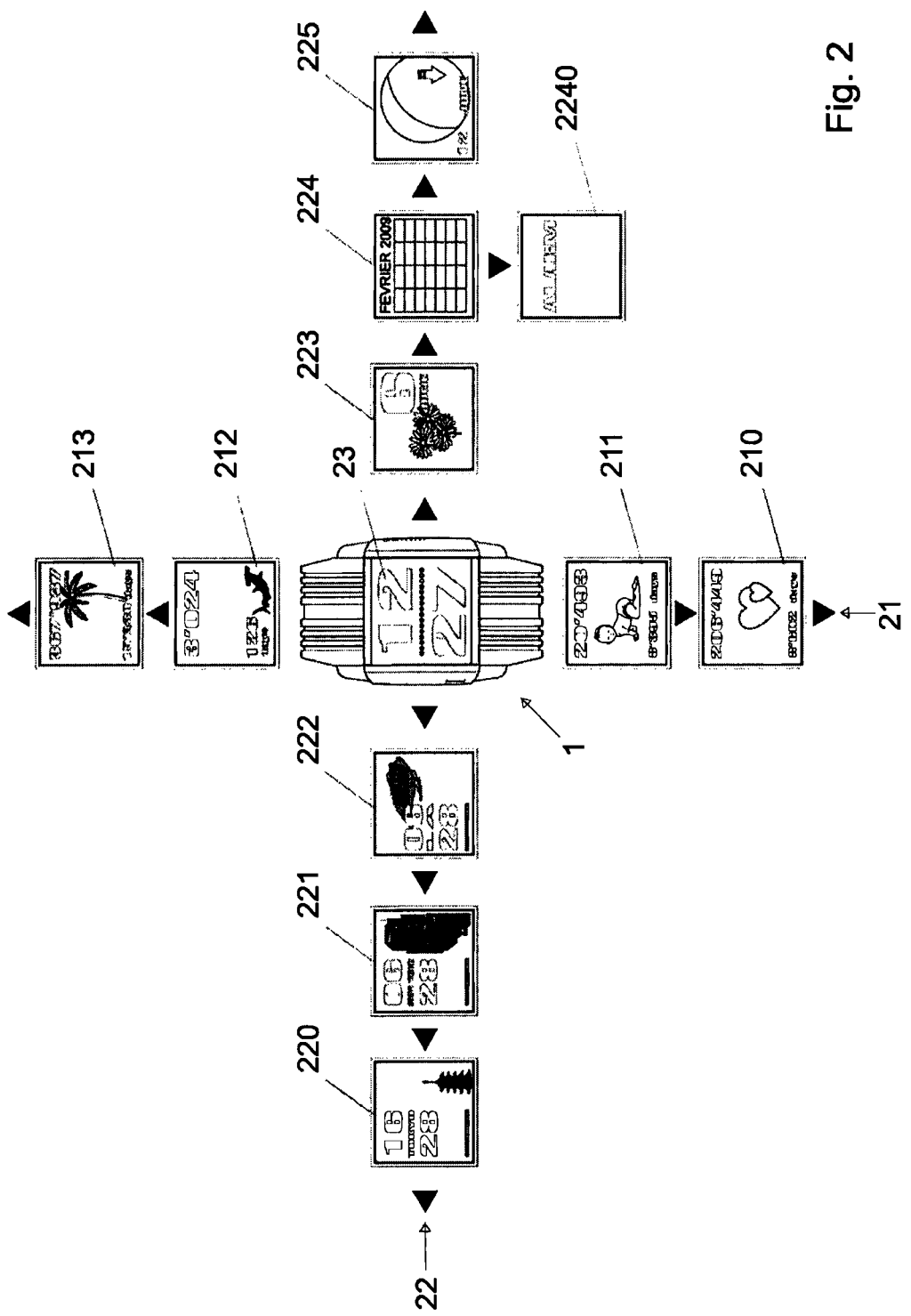
FIG. 2 illustrates diagrammatically the virtual arrangement of different cards in the watch's menu.

FIG. 2 illustrates diagrammatically a possible arrangement of cards according to one embodiment of the invention. Each card corresponds to a virtual screen and enables indications and/or images depending on the card to be displayed. The size of the card corresponds to the size of the display; the total surface available thus corresponds to the sum of the surface of the cards, i.e. a multiple of the display surface. The user can modify the current display by replacing lastingly, or until the next replacement, the displayed card with any other card selected from the list of available cards.

In this arrangement, the cards are arranged virtually so as to constitute a row 22 and a virtual column 21 of cards. The user can make the cards scroll in the horizontal direction, in order to replace the current card 23 with any other card 220 to 225 of the row 22. In the same way, the user can make the cards scroll vertically in order to select one of the cards 210 to 213 of the column 21.

Scrolling the cards in the horizontal or vertical direction is achieved by moving the finger on the glass in the corresponding direction. Thus, the user can easily consult the cards available and choose a particular card with simple movements of the finger in the horizontal or vertical direction. The number of cards in the column 21 and in the row 22 is limited only by the memory capacity of the watch.

The user can advantageously add cards, delete cards, modify the order of the cards in the row and in the column etc. from a particular menu of the watch or from a personal computer connected to the card. Each card can be associated to a computer program or module for computing the data displayed and to data used by this module, for example a screen background image or user preferences stored in the watch. The user can also add his own images as background or illustration in existing cards or add cards with his own images.

As indicated, each card can display a different indication or correspond to a particular mode of operation of the watch. For example, the cards 220, 221 and 222 are used for displaying the current time in the time zones of Tokyo, New York and Los Angeles. The cards 210, 211, 212 and 213 make it possible to display the number of days, respectively of hours, since a given instant, for example since birth, a wedding, the last cigarette etc. Other cards can be used for displaying the phases of the moon, a calendar or further indications of time or other. Furthermore, different cards can be distinguished only by graphical characteristics, for example a background image, or a particular representation of the displayed data. For example, a card could display the time with alphanumeric symbols as in FIG. 1A, another card the same time with hands drawn with pixels on the display, and a third card with a graphic representation by means of sequences of colored symbols whose number corresponds to the hour and to the minutes of the current time.

Organizing the cards in a cross shape makes it easier to scroll and search the cards. Advantageously, when the cards of the column 21 scroll past successively on the display, the row 22 is not altered; the user can thus always switch to card 223 by simply scrolling to the left, whatever the card currently displayed within the single vertical column 21. In the same way, the user can always access directly, with a single vertical command, any card of the column 21, whatever the card currently displayed within the single row 22.

As the cards scroll past very quickly, this organization enables any card to be found easily, even if the number of proposed cards is high. By comparison with a matrix organization, it is thus possible to avoid the risk of the user having to perform several successive scrolling operations or of him failing to find again a particular card.

Exceptions are however possible, for example if they make it easier to switch from one card to another related card. Thus, in the example of FIG. 2, selecting the card 224 from within the horizontal row 22 allows the related card 2240 to be reached directly with a vertical scrolling command. This exception is useful for example to display successively different weeks or different months of a calendar from a particular page of the calendar.

Other card arrangements are also possible; for example, it would also be conceivable to have a card matrix with for example all functions linked to birthdays in one column, all functions linked to the moon in another column etc. and a horizontal navigation on the central row for the main menu.

In another embodiment, switching from the card 224 to the card 2240 (for example) is achieved with a different touch command—for example an oblique movement, a tap, a double tap or a long pressure that can be made anywhere on the glass, or by selecting a particular zone of the image.

The cards of the row 22 and/or of the column 21 can advantageously be organized in closed loops; continuing to scroll beyond the last card will thus lead back to the first one and vice-versa. The user therefore has the impression of cyclically running through cards arranged on the surface of a rotating cylinder or sphere.

In another embodiment, entering a scroll command on the touch screen always causes a return to a starting card 23 and then a scrolling from this card in the scrolling direction given by the command. This embodiment makes navigation even easier as it always starts from the same point and thus requires always the same movements to reach the same target card. It is furthermore possible to avoid confusion if a same card 23 can scroll either horizontally in the row 22 or vertically in the column 21.

In another embodiment, returning to the starting card 23 is achieved manually; the user must first return manually to this card before being able to change the scrolling direction and access other available cards. Other commands to return to the starting card 23 are conceivable, for example with a command zone designed for this purpose.

FIGS. 3*a* to 3*d* illustrate by way of example a horizontal scrolling sequence that allows the starting card 23 displayed in FIG. 3*a* to be replaced by card 213 of FIG. 3*d*. FIG. 3*a* shows the initial display of the current time by means of the card 23. The user now wishes to replace this card with another card 213 that indicates the number of days and hours since his birth. To this effect, he enters in FIG. 3*b* a vertical scrolling command by moving his finger from top to bottom anywhere on the watch glass.

In FIG. 3*c*, the successive cards of column 21 scroll past automatically and continuously in the scrolling direction determined by the direction of the finger on the glass.

In the advantageous embodiment illustrated, the processor displays simultaneously several cards in reduced size during scrolling. This optional counter zoom enables the user to better visualize the scrolling and to find more quickly the position of the card he wishes to reach.

The scrolling proceeds continuously even when the user has released his finger. The cards' scrolling speed in FIG. 3*c* can advantageously depend on the speed and/or the amplitude of the finger's movement on the haptic surface; a greater speed is achieved by giving an impulsion that is very quick and of wide amplitude. Advantageously, the microcontroller determines the energy associated to the trajectory of the finger on the touch-sensitive glass, which varies as a function of the square of the speed of the finger's movement, and then simulates the rotation of a virtual cylinder—or sphere—bearing the cards and driven with a corresponding energy.

To make it more realistic, the card scrolling speed is not constant but diminishes progressively, as if friction were slowing down the cylinder's rotation. It is also possible to slow down the scrolling each time one card switches to the next, then to accelerate again the cylinder after this switch—a little like a tombola wheel that is braked whenever the spring goes over one of the nails on the wheel's periphery.

The scrolling then stops of its own accord after a determined instant or when the scrolling speed falls below a threshold. The display is then increased again and the card 213 that occupies the center of gravity of the display when the scrolling stops is aligned with the edge of the display and shown on the entire display.

Advantageously, the user can also himself stop the scrolling when the correct card is displayed—for example by giving a brief tap of the finger on the center of the screen or, on the contrary, by a continuous pressure on the screen. Commands for movements in opposite direction enable the scrolling direction to be inverted.

A horizontal or vertical display in discrete mode (image by image, each time one scans horizontally or vertically) is also possible as an option. In another scrolling mode, the cards are displayed by simulating visually the pages of a book one flicks through from left to right (or inversely) when scrolling horizontally, and from top to bottom (or inversely) during a vertical movement.

Navigating through the different types of information that can be displayed by the watch is particularly simple since it is achieved simply by replacing cards and with easy operations on the touch screen. Two commands—horizontal scrolling or vertical scrolling—are in principle sufficient for selecting any card and thus displaying all the indications the watch can display.

This however does not exclude the possibility of entering other commands with other operations. Thus, the reduced-size display of FIG. 3c can advantageously be achieved at any time without scrolling the cards, by entering an appropriate command. This reduced-size display constitutes a kind of graphical table of contents that allows the user to determine the best path to reach the desired card.

It is also possible to enter touch commands whose interpretation depends on the card currently displayed. For example, modifying the current time or entering an alarm can for example be initiated from corresponding cards through particular commands, for example with a double tap at the center of the glass to display a menu or widget enabling the desired modification to be entered.

Figure 4A:
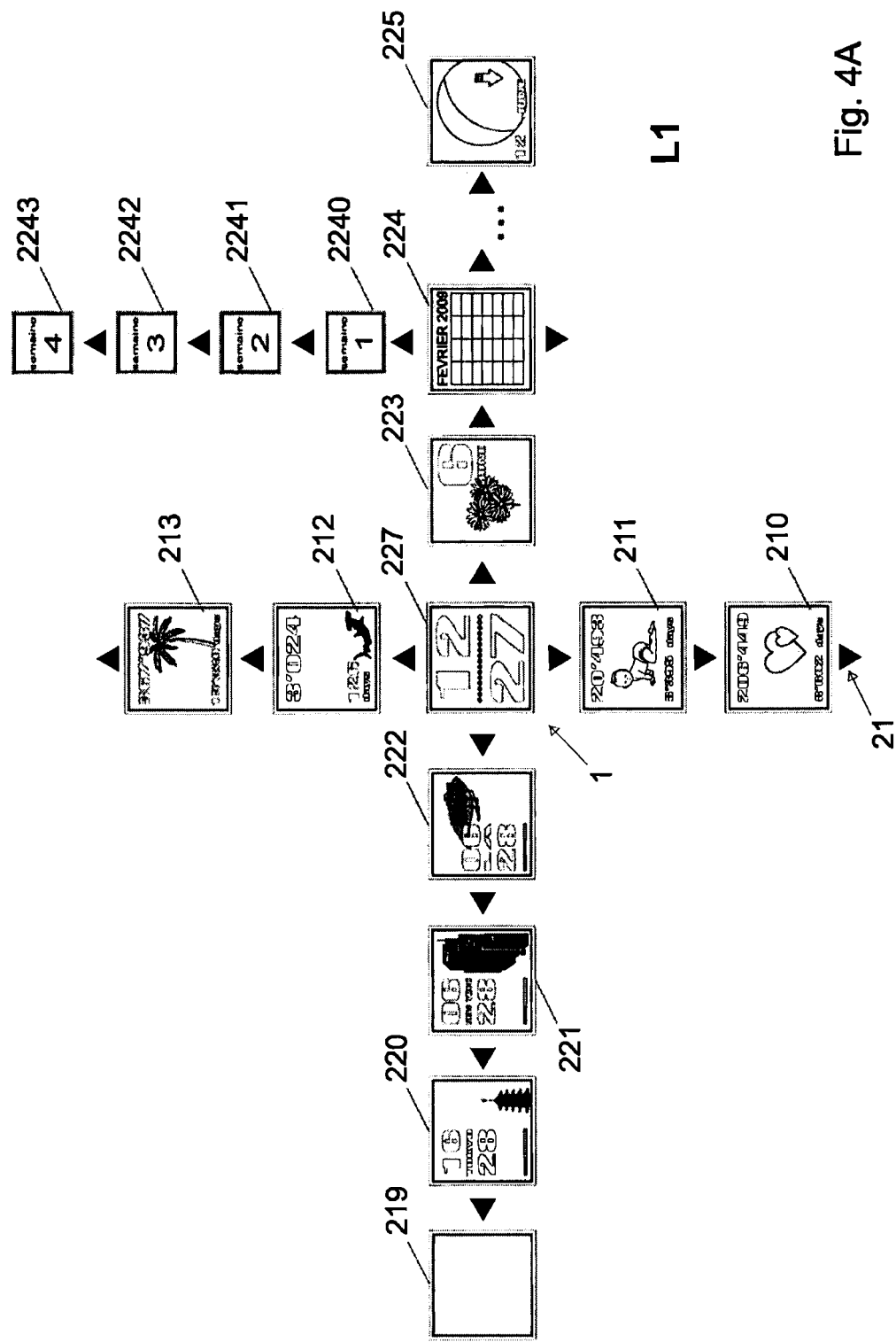
Figure 4B:
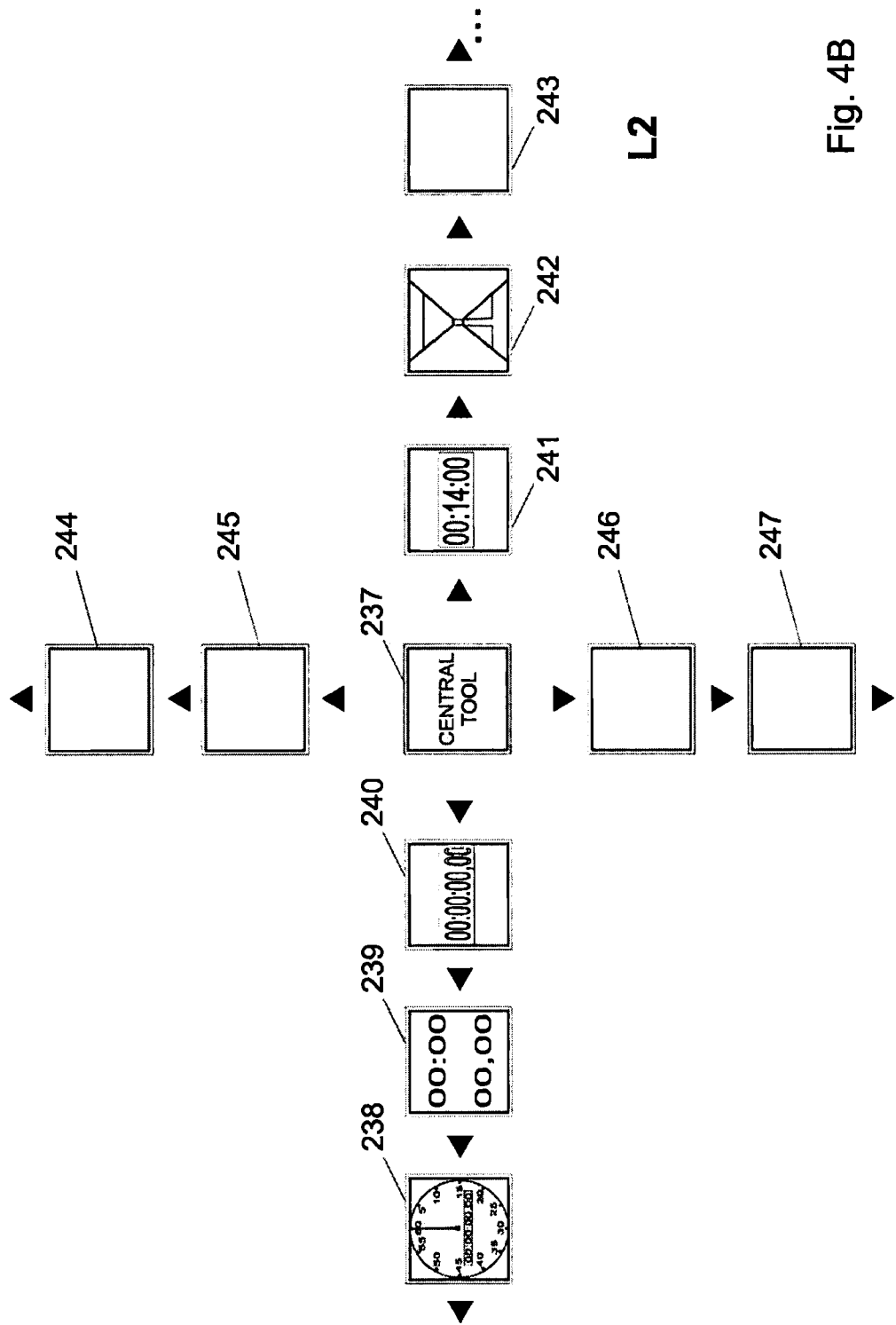

A particularly advantageous organization of the cards displayed on the screens is illustrated by way of example in relation to FIGS. 4a to 4c. In this embodiment, the cards are organized in n levels, for example in 3 levels L1, L2, L3 in this example. Each level groups together cards displaying information of the same type. In this example, the level L1 displayed in FIG. 4a displays basic information connected for example to the time, date, calendar etc.; the organization of this level is similar to that illustrated in FIG. 2, but the navigation is partly different and it is possible to quit this level from the central position to access one of the other levels L2 to Ln.

The level L2 illustrated in FIG. 1b groups together cards dedicated to different watch complications such as chronographs, alarms, countdowns etc. As to level L3, it groups together cards displaying virtual mechanical movements. The user can add new cards on any of these levels; advantageously, the watch's processor executes a program that enables new cards loaded into the watch to be placed automatically at the most appropriate level, at the correct position within this level, according to attributes or metadata associated with each card.

On each level, the cards are arranged predominantly in a cross shape with four main branches (left, right, up, down). Offshoots from a main branch may exceptionally be possible to display more details about a particular card, for example to switch in week display mode rather than in month display mode in a calendar-type card. Thus, navigation within a level occurs mainly through horizontal or vertical scrolling operations, which reduces the risk of getting lost in the card tree structure. Scrolling in a given direction is achieved by moving the finger on the touch screen, which causes the cards to move continuously in the finger's preferential direction; the speed and amplitude of the cards' displacement depend on the impulsion given by the finger. The user can stop the scrolling and select a card during scrolling with a tap on this card; the selected card will automatically be centered.

Switching from one level to another occurs in a loop, preferably always from the card at the center of the cross, by means of a suitable command. In one example, switching from one level to another is achieved by pressing for a sufficient duration (for example at least two seconds) on one electrode at the center of the central card or on an icon dedicated to this card. By default, the display returns of its own accord to the display of the card at the center of the current level, for example when the display is activated or after a determined duration. In this manner, navigation is comfortable even on a small-size screen and the user does not risk getting lost in a complex tree structure.

FIG. 4a illustrates an example of organization of the cards on the level 1, dedicated to the watch's basic functions. From the central card 227, which displays for example the current time in analog and/or digital form, the user can navigate along a vertical axis and move onto other cards with fixed or animated images 210 to 213. In the illustrated example, the cards 212 and 213 displayed on the upper vertical branch correspond to future events, for example planned holidays or an important event; the card can for example display the remaining time until this event. The cards 211 and 210 displaced on the lower vertical branch correspond to past events, for example birth or marriage; the card can for example display the time elapsed since this event. The users can personalize the cards of each event with their own images or add new cards corresponding to other events over a computer temporarily connected to the watch.

The number of cards available on this vertical axis is limited only by the watch's memory capacity. The image displayed as screen background on a particular card can be fixed, or changed automatically to slideshow mode from among a collection of cards associated to a particular card. For example, a user can associate to a particular card a slideshow of his/her wedding, and to another card images of his/her holidays. Other cards can be associated with animated video images. These data are preferably downloaded from a computer temporarily connected to the watch.

The horizontal axis of the first level L1 in FIG. 4a makes it possible to switch time zone (by moving leftwards in the direction of the cards 220 to 222) or to display a calendar by moving towards the right from the central position. The cards 220 to 222 towards the left preferably comprise an image, a text or a graphic element illustrating a particular time zone, for example with the name of the time zone or an image conjuring up a city in this time zone. The user selects a given time zone simply by scrolling horizontally; the selection is confirmed by means of a long pressure at the center of the screen (for example at least one second), failing which the watch returns of its own accord to displaying the central card 227.

Replacing the card can also cause the type of time-display to be changed and, for example, an analog time display to be switched to a digital time display with a font, size, color and choice of indications being variable from one card to the next along this axis. In one embodiment, the users can select from their computer the font and color used to display the time on each of the card as well as, possibly, the position of this display, the size and type of indications displayed.

The screen background displayed on the cards is typically constituted by a fixed or an animated image that has been pre-recorded as a file in the watch. The superimposed indications, such as the time or other indications, are preferably constituted by computer-generated images generated in real-time by the watch and superimposed onto the background.

From a computer connected to the watch, a user can add or define different cards on the horizontal axis (and elsewhere in the tree structure of any level), for example add cards corresponding to useful time zones. It is also possible to delete certain time zones that are less useful, or to modify the sequence of the time zones in order to group together the most useful ones close to the central card 227. From the central card and from a particular time zone card, for example from card 221, it is possible to set the watch by selecting the digits for the hours, the minutes or the seconds to be changed, then by having the corresponding digit turn or scroll to be replaced by a new digit. It is also possible to move the hands or other indicators with the finger on the touch screen in order to set the watch.

The user can change the card used by default as central card 227, for example by performing a particular command from one of the cards of the line 219 to 225, for example by means of a long pressure at the center of the screen (for example at least one second). The change can also be performed from a computer temporarily connected to the watch.

By moving to the right from the central position 227, the user can display different cards corresponding to different calendars. The calendar 223 displays the day's date in front of an image that can be selected by the user. The card 224 enables the current month to be displayed in calendar mode; it is possible to switch to week mode, or even to day mode, by scrolling upwards from this card 224 in a loop that reverts to the starting card 224 or from another calendar card. From the card 224, a scrolling to the right enables the calendar of the subsequent months to be displayed. The last card 225 displays for example the moon phase.

FIG. 4B illustrates by way of example a possible organization of the cards on the second card level L2 of the invention. This level groups together screens corresponding to different watch complications that can be displayed by the watch. The user reaches card 237 of this level by means of a long pressure performed from the central card 227 of the first level.

By moving horizontally towards the left, the user can select several types of chronographs, for example a chronograph up to the hundredth of second (card 240), a chronograph with simultaneous display of the interim time 239, or an analog chronograph with hands 238. Other chronographs can be added by the user by loading new cards from a computer.

According to one characteristic of the invention, the default behavior during scrolling on this level is different from the behavior on the other levels; a selected card, for example a particular chronograph, remains displayed as long as the user does not himself/herself revert to another card. The display therefore does not revert by default to the central card 237. A particular behavior, different to the level's default behavior, can however be allocated to each card of each level. It is also possible to provide for an automatic return to the central image after a predefined time following a time count.

From a particular chronograph, for example from the chronograph 239, the user can start a time count with a quick tap, record an interim time with a new quick tap, then interrupt the count with a prolonged pressure at the centre. Resetting to zero of the chronograph is achieved for example by means of an extended pressure of more than one second at the center of the screen. Other control modes are also possible, for example by pressing with the finger on one of the four corners of the touch screen (with a logo or graphical element indicating the command or the active zone being present or not).

The user can also select several countdown types by moving horizontally to the right from the central position 237 (screens 241, 242, 243). In the example, one of the countdowns on the card 241 is digital, the one represented on the card 242 is illustrated by an hourglass etc. As for the different chronographs, the user can start and interrupt a countdown by means of a particular action from one of the cards 241 to 243.

Other complications or tools can be selected by moving vertically from the central card 237, in order to choose for example cards corresponding to video films, particular calendars for tides, etc. The user can load himself/herself new cards from a computer temporarily connected to the watch.

FIG. 4C illustrates by way of example a possible organization of the cards on the third card level L3 of the invention. This level groups together, around the central card 248 on the vertical axis 255 to 262, screens displaying various virtual mechanical watches simulated by the watch's processor and displayed on the touch screen. The user can thus replace a simulated mechanical watch with another watch of different type by a simple selection on this horizontal axis of the third level L3. The vertical axis 210 to 212 is in this example identical to that of the first level.

The different cards 255 to 262 of simulated mechanical movements can for example correspond to the same movement displaying the time of different time zones, for example the time in New York on the screen 257 and that in Tokyo on the screen 258. They can also display and simulate completely different watches, as on screen 262. The simulation program of a particular movement is preferably part of the card and can be downloaded with this card to be executed by the watch's processor when the associated card is selected.

The displaying of a particular movement preferably involves three-dimensional simulation of the watch mechanism. In order to reduce the computation time, certain displayed elements, for example static elements such as the bridges, the bottom plate etc. are preferably constituted by fixed or animated images, whilst the elements whose position depends on the time, such as the gearings, staffs, escapements, hands etc. are preferably computer-generated in real time by the watch's processor depending on the current time, and superimposed over the loaded image.

In order to improve the realism of the display, the watch preferably integrates an accelerometer. The acceleration measurements are used by the image-generation program in order to simulate the effect of shocks or accelerations on the movement. For example, it is possible to simulate the effect of gravity on a regulating element or on a tourbillon.

In order to further improve the realism of the display, the touch screen preferably makes it possible to directly actuate the parts displayed, for example in order to directly move a hand or any other element of the movement.

The image-generation program preferably calculates the shadows and reflections on the different parts. A light sensor can be used to improve the displaying of shadows and reflections. It is also possible to take into account the current time to modify these elements.

The time displayed by the simulated mechanical movement is advantageously a result of the simulation calculations and can be different from the time determined by the watch's quartz, for example if the size of the regulating element results in an imperfect isochronicity. The time displayed by the simulated movement can also be affected by shocks detected by the accelerometer, by the user's operations on the touch screen, etc. Time setting can be performed for example from buttons or crowns on the watchcase or in a haptic manner through the screen.

REFERENCE NUMBERS USED IN THE FIGURES 1 wristwatch
2 bracelet
3 glass or crystal
4 matrix display
5 case
21 column of cards
22 row of cards
23 starting card
219 card relating to the sun rise and sun set times
220-222 cards for displaying the time in three different time zones
210-213 cards for displaying the number of days or hours since a given event
223 card for displaying the current date
224 card for displaying a calendar
2240-2243 cards for adding an alarm in the calendar respectively for visualizing the weeks of the month
225 card for displaying the phase of the moon
227 central card of the level 1
237 central card of the level 2
238-240 chronograph cards on the level 2
241-243 count-down cards on the level 2
244-247 cards for additional complications or gadgets
248 central card of the level 3
255-262 cards corresponding to virtual mechanical movements

We claim:
1. A wristwatch having:
    a digital matrix display;
    a sheet of touch-sensitive glass;
    a processing circuit specifically laid out so as to interpret the signals from the touch-sensitive glass, for selecting a card from several available cards depending on these signals and for displaying said card on the entire digital matrix display;
    wherein said touch-sensitive glass is a two-dimensional glass for detecting a movement of at least one finger at any place on the touch-sensitive glass along at least two different directions;
    wherein said processing circuit is specifically laid out so as to cause said several available cards to scroll past in order to lastingly replace the initially displayed card with a replacement card selected between said several available cards, wherein each card of said several available cards has a distinct fixed or periodically refreshed image,
    wherein the size of the image corresponds to the size of said digital matrix display so that the displayed card occupies the whole of said digital matrix display;
    wherein one card of said several available cards and occupying the entire digital matrix display is immediately and without further user intervention replaced after the scrolling by a different card of said several available cards that occupies the entire digital matrix display;
    wherein said processing circuit is further laid out so that the replacement card is dependent from the initially displayed card and from the direction of said movement and is independent from the starting point and end point of said movement on said digital matrix display.
2. The wristwatch of claim 1, wherein each card shows a particular function of the wristwatch.
3. The wristwatch of claim 2, wherein each card defines the behavior of the touch-sensitive glass interface and the functions or modules that are to be launched depending on the movements of the finger on the card.
4. The wristwatch of claim 2, wherein said cards are arranged in a plurality of levels, wherein the choice of a card within each level is made either by scrolling vertically or by scrolling horizontally, wherein a particular command makes it possible to switch from one level to another.
5. The wristwatch of claim 4, wherein at least one of said cards makes it possible to calculate and display a simulation of a mechanical watch displaying the time, so as to enable the user to change the mechanical watch displayed by scrolling cards.
6. The wristwatch of claim 1, wherein the processing circuit being laid out for detecting simultaneous contacts on several points of the touch-sensitive glass so as to constitute a multi-touch haptic screen.
7. The wristwatch of claim 1, wherein the processing circuit being laid out for determining the displacement of the center of gravity of the contact zone of the finger on the touch-sensitive glass.
8. The wristwatch of claim 1, wherein said several available cards are organized in a virtual closed loop row or in a virtual closed loop column.
9. A method for replacing an initially displayed card displayed by a wristwatch by a replacement card, the method having the following steps:
    detecting a direction of a movement of at least one finger at any place and along at least two different directions on a two-dimensional touch-sensitive glass;
    scrolling on a digital matrix display of several available cards so as for said scrolling to stop of itself so as to align an edge of the replacement card with an edge of the matrix display, wherein one card of said several available cards and occupying the entire digital matrix display is replaced after the scrolling, immediately and without further user intervention, by a different card selected between said several available cards and occupying the entire digital matrix display; and wherein the scrolling direction depends only on the direction of said movement so that said replacement card is dependent from the initially displayed card and from the direction of said movement and is independent from the starting point and end point of said movement on said digital matrix display;

lastingly displaying the replacement card on the whole of said digital matrix display, wherein each card of said several available cards has a distinct fixed or periodically refreshed image, the size of the images corresponding to the size of said digital matrix display.

10. The method of claim 9, further including the entering of a touch command for confirming or stopping the scrolling.

11. The method of claim 9, further comprising the detecting of simultaneous contacts on several points of the two-dimensional touch-sensitive glass.

12. The method of claim 9, further comprising the determining of the displacement of the center of gravity of the contact zone of the finger on the two-dimensional touch-sensitive glass.

13. The method of claim 9, wherein the different cards scroll in continuous fashion on the digital matrix display, the scrolling being interrupted so as to align the edge of a card with the edge of the digital matrix display.

14. The method of claim 13, wherein the card scrolling speed or amplitude depend on the speed or amplitude of movement of the finger on the two-dimensional touch-sensitive glass.

15. The method of claim 14, wherein the card scrolling speed is variable, the scrolling being slowed down before stopping completely.

16. The method of claim 15, wherein the card scrolling speed is variable, the scrolling being slowed down each time a card is switched to another one.

17. The method of claim 13, wherein the card scrolling is interrupted by a brief pressure on the two-dimensional touch-sensitive, so as to cause the card best centered on the display at the time of the interruption to be selected and displayed.

18. The method of claim 9, wherein the size of the displayed cards is reduced during scrolling, so as to display several cards simultaneously.

19. The method of claim 9, wherein said cards are arranged in a plurality of levels, wherein the method comprises a step of vertical or horizontal scrolling and a step of entering a particular command for switching from one level to another.

20. The method of claim 9, wherein a plurality of said cards displays a simulation of a virtual mechanical movement.

21. The method of claim 9, wherein said several available cards are organized in a virtual closed loop row or in a virtual closed loop column.

22. The method of claim 9, wherein said several available cards are organized in a virtual closed loop row and in a virtual closed loop column.

23. A wristwatch having:
a digital matrix display;
a sheet of touch-sensitive glass;
a processing circuit specifically laid out so as to interpret the signals from the touch-sensitive glass, for selecting a card from several available cards depending on these signals and for displaying said card on the entire digital matrix display, wherein each card has a distinct fixed or periodically refreshed image;
wherein said touch-sensitive glass is a two-dimensional glass for detecting a movement of at least one finger at any place on the touch-sensitive glass along at least two different directions;
wherein said processing circuit is specifically laid out so as to cause said several available cards to scroll past by displaying the image of said cards one at a on the digital matrix display in order to lastingly replace the initially displayed card with a replacement card selected within said several available cards, immediately after the scrolling and without further user intervention;
wherein the size of the image corresponds to the size of said digital matrix display so that the displayed card occupies the whole of said digital matrix display;
wherein said processing circuit is further laid out so that the replacement card is dependent from the initially displayed card and from the direction of said movement and is independent from the starting point and end point of said movement on said digital matrix display.

24. A wristwatch having:
a digital matrix display;
a sheet of touch-sensitive glass;
a processing circuit specifically laid out so as to interpret the signals from the touch-sensitive glass, for selecting a card from several available cards depending on these signals and for displaying said card on the entire digital matrix display;
wherein said touch-sensitive glass is a two-dimensional glass for detecting a movement of at least one finger at any place on the touch-sensitive glass along at least two different directions;
wherein said processing circuit is specifically laid out so as to cause cards to scroll past in order to lastingly replace the initially displayed card with a replacement card, wherein each card has a fixed or periodically refreshed image,
wherein the size of the image corresponds to the size of said digital matrix display so that the displayed card occupies the whole of said digital matrix display
wherein said processing circuit is further laid out so that the replacement card is dependent from the initially displayed card and from the direction of said movement and is independent from the starting point and end point of said movement on said digital matrix display; and
wherein said several available cards are organized in a virtual closed loop row and in a virtual closed loop column.

* * * * *